(12) United States Patent
Lynas et al.

(10) Patent No.: US 10,501,170 B2
(45) Date of Patent: Dec. 10, 2019

(54) AIRCRAFT WING WITH A WING TIP DEVICE AND A STRUT

(71) Applicant: AIRBUS OPERATIONS LIMITED, Bristol (GB)

(72) Inventors: Christopher Lynas, Bristol (GB); Robert Thompson, Bristol (GB); Llifon Williams, Bristol (GB); John Hobday, Bristol (GB)

(73) Assignee: Airbus Operations Limited, Bristol (GB)

( * ) Notice: Subject to any disclaimer, the term of this patent is extended or adjusted under 35 U.S.C. 154(b) by 298 days.

(21) Appl. No.: 15/301,489

(22) PCT Filed: Apr. 2, 2015

(86) PCT No.: PCT/GB2015/051033
§ 371 (c)(1),
(2) Date: Oct. 3, 2016

(87) PCT Pub. No.: WO2015/150817
PCT Pub. Date: Oct. 8, 2015

(65) Prior Publication Data
US 2017/0029094 A1  Feb. 2, 2017

(30) Foreign Application Priority Data
Apr. 4, 2014 (GB) .................................. 1406091.7

(51) Int. Cl.
*B64C 23/06* (2006.01)
*B64C 3/56* (2006.01)
(Continued)

(52) U.S. Cl.
CPC ............ *B64C 23/072* (2017.05); *B64C 3/546* (2013.01); *B64C 3/185* (2013.01); *B64C 3/54* (2013.01);
(Continued)

(58) Field of Classification Search
CPC ... B64C 23/065; B64C 23/069; B64C 23/072; B64C 23/076; B64C 3/54; B64C 3/56
See application file for complete search history.

(56) References Cited

U.S. PATENT DOCUMENTS 4,365,773 A    12/1982 Wolkovitch
4,541,593 A *   9/1985 Cabrol ................. B64C 39/068
                                                      244/199.4
(Continued)

FOREIGN PATENT DOCUMENTS

CN    201269170     7/2009
CN    102358417     2/2012
(Continued)

OTHER PUBLICATIONS

International Search Report and Written Opinion of the ISA for PCT/GB2015/051033 dated Jun. 5, 2015, 8 pages.
Search Report for GB1406091.7 dated Oct. 7, 2014, 1 page.

*Primary Examiner* — Philip J Bonzell
*Assistant Examiner* — Tye William Abell
(74) *Attorney, Agent, or Firm* — Nixon & Vanderhye P.C.

(57) ABSTRACT

An aircraft wing (1) has a wing tip device (3) joined thereto. The root (7) of the wing tip device (3) is joined to the tip of the wing (1) at a first connection (11). An external strut (9) extends between the wing (1) and the wing tip device (3), the strut (9) being joined to the wing (1) at a second connection (13). The second connection (13) is inboard of the first connection, such that loadings on the wing tip device (3) generated during use, are transferred, via the strut (9), to a location on the wing (1) that is inboard of where the root (7) of the wing tip device (3) is joined to the tip of the wing.

27 Claims, 12 Drawing Sheets

(51) Int. Cl.
 *B64C 3/54* (2006.01)
 *B64C 3/18* (2006.01)
(52) U.S. Cl.
 CPC ............... *B64C 3/56* (2013.01); *Y02T 50/14* (2013.01); *Y02T 50/164* (2013.01)

(56) References Cited

U.S. PATENT DOCUMENTS

| | | | |
|---|---|---|---|
| 5,102,068 A | 4/1992 | Gratzer | |
| 5,988,563 A * | 11/1999 | Allen | B64C 3/42 244/49 |
| 6,474,604 B1 | 11/2002 | Carlow | |
| 8,657,226 B1 * | 2/2014 | McGinnis | B64C 3/16 244/45 R |
| 8,888,039 B2 * | 11/2014 | Gall | B64C 5/06 244/87 |
| 2004/0262451 A1 * | 12/2004 | McLean | B64C 3/10 244/45 R |
| 2012/0112005 A1 * | 5/2012 | Chaussee | B64C 23/072 244/123.1 |
| 2012/0187251 A1 * | 7/2012 | Guida | B64C 13/16 244/199.4 |
| 2013/0056579 A1 * | 3/2013 | Schlipf | B64C 3/56 244/49 |
| 2013/0119193 A1 * | 5/2013 | Gall | B64C 5/06 244/87 |
| 2013/0139421 A1 * | 6/2013 | Edmond | G09F 21/10 40/212 |
| 2013/0277504 A1 * | 10/2013 | Heller | B64C 23/069 244/35 R |
| 2015/0041597 A1 * | 2/2015 | Theurich | B64C 23/069 244/199.4 |
| 2015/0203190 A1 * | 7/2015 | Witte | B64C 23/069 244/199.4 |
| 2016/0009379 A1 * | 1/2016 | Witte | B29C 70/44 244/1 A |

FOREIGN PATENT DOCUMENTS

| | | |
|---|---|---|
| DE | 197 52 369 | 5/1999 |
| DE | 10 2010 018977 | 11/2011 |
| EP | 0 770 545 | 5/1997 |
| FR | 2 579 169 | 9/1986 |
| GB | 16924 | 3/1915 |
| WO | WO 03/008267 | 1/2003 |
| WO | WO 2012/171034 | 12/2012 |

* cited by examiner

AIRCRAFT WING WITH A WING TIP DEVICE AND A STRUT

RELATED APPLICATIONS

This application is the U.S. national phase of International Application No. PCT/GB2015/051033 filed Apr. 2, 2015, which designated the U.S. and claims priority to Great Britain Patent Application GB 1406091.7 filed 4 Apr. 2014, the entire contents of these applications are incorporated by reference.

BACKGROUND OF THE INVENTION

The present invention relates to an aircraft wing with a wing tip device and strut extending between the wing and the wing tip device, an aircraft incorporating such a wing, and to methods of modifying an aircraft wing to install a wing tip device.

In recent years, it has become increasingly desirable to install wing tip devices to aircraft wings. It is known to install wing tip devices onto aircraft that are already in use (for example a wing tip device may be added during a major maintenance overhaul of the aircraft). This is commonly referred to as "retro-fitting" the wing tip device. It is also known to install wing tip devices during manufacture of a new aircraft, but where that aircraft was not originally designed to have the wing tip device installed, thereby enabling incremental improvements to existing aircraft designs. This is commonly referred to as "forward-fitting" the wing tip device.

A problem when attempting to retro-fit or forward-fit a wing tip device is that the wing (to which the tip devices is being fitted) was not originally designed to receive the wing tip device. In known retro-fit or forward-fit solutions, the wing tip device is either attached using splice plates or butt straps spanning the upper and lower surfaces of the wing/wing tip device, or by joining the wing tip device to the wing box by a series of tension bolts. In both these arrangements, it can be difficult to efficiently distribute the loads generated by the wing tip device during use. More specifically, the wing tip device loading is reacted through a small moment arm (the thickness of the wing box) and thus the loads in the wing tip are concentrated in a small area. This problem is especially acute for large wing tip devices (which are becoming increasingly popular). To cope with these high loads, some structural re-enforcement is often necessary. This can add weight and/or complexity to the process of retro-fitting or forward-fitting the wing tip device. Furthermore, the scope for modifying the structure of the wing is often very limited, so the structural reinforcements are often sub-optimal, compared to if they had been able to be incorporated into the wing during the initial design process.

A solution proposed to combat the problem of high loads at the wing/wing tip joint is described in US2012/112005. This describes an arrangement in which the wing tip device has two mounting formations spaced apart in a spanwise direction for attaching to the spar and/or rib of the wing. The spacing between the formations is greater than the thickness of the wing box. Such an arrangement therefore enables the bending moment from the wing tip device to be reacted over a large moment arm, and the loads to therefore be reduced. However, this arrangement is not really suitable for a retro-fit or a forward fit application, because the structural modifications to the wing are too significant.

The present invention seeks to overcome or mitigate at least some of the above-mentioned problems.

SUMMARY OF THE INVENTION

According to a first aspect of the invention, there is provided an aircraft wing having a wing tip device joined thereto, wherein the root of the wing tip device is joined to the tip of the wing at a first connection, and wherein an external strut extends between the wing and the wing tip device, the strut being joined to the wing at a second connection, the second connection being inboard of the first connection, such that loadings on the wing tip device generated during use, are transferred, via the strut, to a location on the wing that is inboard of where the root of the wing tip device is joined to the tip of the wing.

The second connection is preferably located closer to the wing tip than to the wing root. The second connection may be located in the vicinity of the wing tip (albeit inboard thereof). The second connection may, for example, be located at a distance of less than 30%, or even less than 15%, of the wing semi-span from the wing tip.

By using a strut between the wing tip device and the wing, at least some of the loadings on the wing tip device can be transferred to a location inboard of the connection between the wing/wing tip device. This inboard location can be better suited to cope with the loadings (for example the wing box may be thicker at that inboard location than at the wing tip and/or more suited to the use of preferred fasteners, such as shear bolts). Thus, for a given size of wing tip device, fewer structural reinforcements to the wing may be required, and/or for a given level of reinforcement, a larger, more effective wing tip device may be installed (relative to an arrangement in which the wing tip device only being connected at the wing tip).

The present invention is especially attractive where the wing tip device is installed on a wing that was not originally designed to have such a wing tip device. This is because the use of an external strut to transfer the loading tends to necessitate fewer structural modifications to the wing (compared to known retro or forward fit solutions). The wing tip device of the present invention is preferably retro-fitted or forward-fitted to the wing. The wing is preferably originally designed not to have the wing tip device. For example the trailing and leading edges of the wing may be substantially continuous (e.g. free of discontinuities and abrupt changes in chord) between the first connection and a location inboard of the second connection.

The invention may enable the first connection to be weaker, and therefore lighter, than would otherwise be required in the absence of the strut. The first connection is preferably unsuitable for transferring the loadings on the wing tip device to the wing, in the absence of the strut. For example the first connection may be too weak to safely be relied upon, in isolation, to transfer the loadings. Such an arrangement may facilitate weight savings, without compromising safety.

The root of the wing tip device will be readily identifiable. The root is typically the location of maximum chord of the wing tip device.

Loadings on the wing tip device generated during use, are transferred, via the strut to the wing. The loadings comprise at least some of the loading on the wing tip device generated during use. The loadings may comprise substantially all of the loading on the wing tip device generated during use. The loadings on the wing tip device may result in bending moment loadings about the root of the wing tip device. The strut may be arranged to be in compression during use. In preferred embodiments the strut is arranged to be under tension during use.

The first connection may be substantially unable to support a bending moment across it. For example, the first connection may be a pin-joint. The first connection is preferably unable to support a bending moment generated by the weight of the wing tip device acting around the connection. Such an arrangement is beneficial because during installation, the wing tip device may be connected to the wing at its root (i.e. at the first connection) and then be allowed to hang down under its own weight. Thus the wing tip device does not have to be supported by an auxiliary structure whilst the strut is installed. This facilitates relatively straightforward installation of the wing tip device and of the strut.

The assembly comprising the wing, the strut and the wing tip device is preferably statically determinate. Such an arrangement is beneficial because it enables the loads in the structure to be calculated more easily, thereby enabling the assembly to be more efficiently engineered. The first and/or second connections are preferably arranged such that the structure is statically determinate. For example the first and/or second connections may be unable to support a bending moment across them.

The end of the strut that is distal from the second connection, may be integral with the wing tip device. Thus the strut may be structurally integral with the wing tip device and vice versa. More preferably, the strut is joined to the wing tip device at a third connection. The third connection is remote from the first connection. The third connection may be substantially unable to support a bending moment across it. The strut is preferably shaped not to be a continuation of the wing tip device. The strut preferably forms a different aerodynamic function to the wing tip device.

The wing tip device is preferably rotatable about the first connection. The wing tip device may be rotatable to between a high load configuration and a lower load configuration. For example, the first connection may be arranged such than when the wing tip device rotates about it, the aerodynamic loading on the wing tip device is reduced (i.e. it moves from a high-load configuration to a lower-load configuration). Movement between the two configurations may be achieved passively (for example by orientating the axis of rotation in the first connection such that the wing tip device can rotate to the lower load configuration under the influence of the aerodynamic forces acting on the wing tip device). In other embodiments, the movement may be achieved actively (for example an actuator may be arranged to rotate the wing tip device between the two configurations).

Alternatively or additionally, the wing tip device may be moveable between (i) a flight configuration for use during flight, and (ii) a ground configuration for use during ground-based operations, in which ground configuration the wing tip device is folded (i.e. rotated) about the first connection such that the span of the aircraft is reduced. Such an arrangement is beneficial because it enables the aircraft to have a relatively large span during flight, whilst also having a span on the ground that can comply with airport gate limits etc.

In the flight configuration, the trailing edge of the wing tip device is preferably a continuation of the trailing edge of the wing. The leading edge of the wing tip device is preferably a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. At least at the root of the wing tip device, and preferably along the length of the wing tip device, the upper and the lower surfaces of the wing tip device may be continuations of the upper and lower surfaces of the wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The strut may be aerodynamically faired to minimise its drag co-efficient. In some embodiments, the strut may be of aerofoil section. The chord of the strut is preferably less than the root chord of the wing tip device. The chord of the strut is preferably less than the chord of the wing tip device at the location the strut joins the wing tip device. The chord of the strut is preferably less than the chord of the wing at the location of the second connection.

The strut may be arranged to join the wing tip device at a location part-way along the length of the wing tip device. For example, the wing tip device may extend either side of the location at which the strut joins the wing tip device.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

The wing tip device may take a number of forms. For example, the wing tip device may be a winglet (upwardly or downwardly extending), a planar tip extension, wing tip fence etc. or a combination of different wing tip devices.

The wing tip device preferably does not comprise any control surfaces (for example the wing tip device preferably does not contain any flaps, ailerons and/or slats). Having such a wing tip device is beneficial because it does not require any infrastructure for operating the control surface.

According to another aspect of the invention, there is provided a method of modifying a wing by fitting a wing tip device, the method comprising the steps of: joining the root of the wing tip device to the tip of the wing at a first connection, and fitting a strut extending between the wing and the wing tip device, the strut being connected to the wing at a second connection, the second connection being inboard of the first connection, such that loadings on the wing tip device generated during use, are transferred, via the strut, to a location on the wing that is inboard of where the root of the wing tip device is joined to the tip of the wing.

By fitting the wing tip device using such a method, at least some of the loadings on the wing tip device during use, can be transferred to a location inboard of the connection between the wing/wing tip device (i.e. the first connection). This inboard location can be better suited to cope with the loadings (for example the wing box may be thicker at that inboard location than at the wing tip). Thus, for a given size of wing tip device, fewer structural re-enforcements to the wing may be required, and/or for a given level of re-enforcement, a larger wing tip device may be installed (relative to an arrangement in which the wing tip device only being connected at the wing tip).

The wing tip device may be retro-fitted onto a wing that was not originally designed to receive the wing tip device. Thus, the method may comprise the step of modifying the wing prior to joining the root of the wing tip device to the tip of the wing at the first connection. The method may comprise the step of removing pre-existing structure from the wing, prior to joining the root of the wing tip device to the tip of the wing at the first connection. The pre-existing structures may comprise part of the original wing tip (for example the tip covering). The pre-existing structure may comprise a different wing tip device (which is to be replaced by the wing tip device in the present invention). The method may comprise the step of adding additional hardware (such as plates, bolts or reinforcement) to allow the wing tip device to be installed.

The wing tip device may be forward-fitted onto a wing that was not originally designed to receive the wing tip device. Thus, the method may comprise the step of manufacturing the tip of the wing to be suitable for joining to the root of the wing tip device at the first connection.

The first connection may be substantially unable to support a bending moment across it. The method may comprise the step of joining the root of the wing tip device to the tip of the wing at a first connection, and subsequently allowing the wing tip device to hang from the first connection prior to the strut being fitted to extend between the wing and the wing tip device. Such an arrangement facilitates a relatively easy installation of the wing tip device. The wing tip device may freely hang below the first connection. The wing tip device may be arranged to be partially supported when hanging from the first connection; for example it may be partially supported such that it is not freely hanging, but such that the moment arm, created by its weight acting around the first connection, is relatively small.

According to another aspect of the invention, there is provided a strut and wing tip device for use as the strut and wing tip device described herein.

According to another aspect of the invention, there is provided an aircraft having the wing and wing tip device described herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
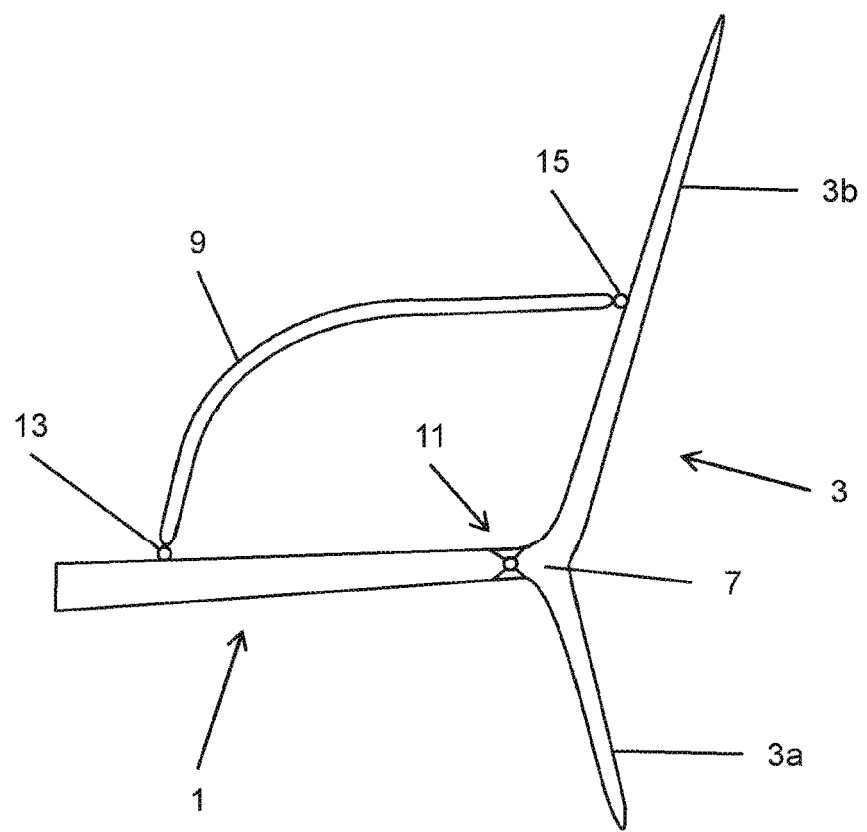
FIG. 1a shows a front view of part of a wing and a wing tip device on an aircraft according to a first embodiment of the invention.
Figure 1B:
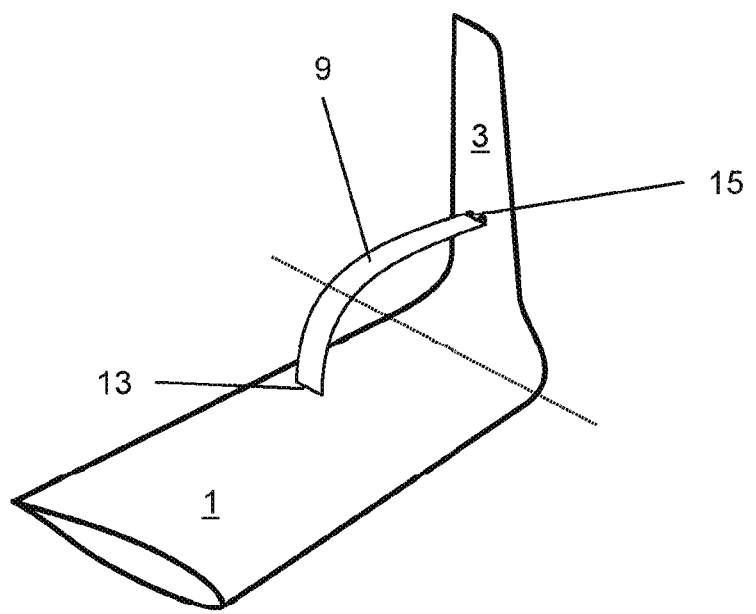
FIG. 1b shows the wing and wing tip device of FIG. 1a but in a perspective view from above.
Figure 1C:
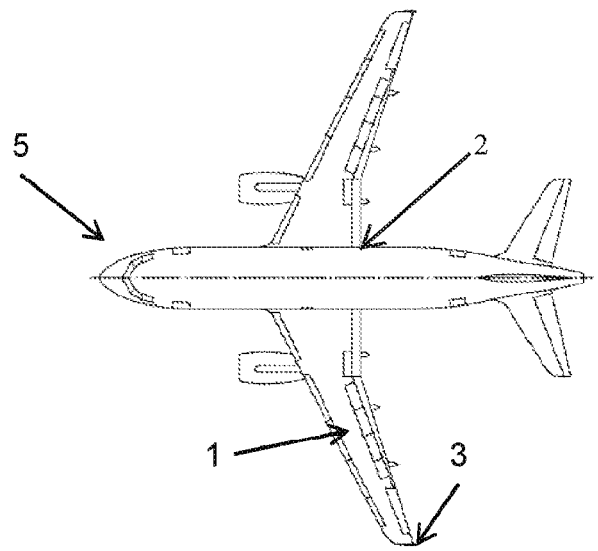
FIG. 1c shows the aircraft incorporating the wing and wing tip device of FIGS. 1a and 1b.

FIGS. 1a and 1b show the end of an aircraft wing 1 with a wing tip device 3 joined thereto. The wing 1 is on an aircraft 5 (shown in plan view in FIG. 1c). The aircraft 5 has been in service for sufficient time for it to have recently required a major maintenance overhaul. As part of that overhaul, the wing tip device 3 was retro-fitted to the wing.

Referring back to FIGS. 1a and 1b, the wing tip device 3 (see also 303, 403, 1003 and 1103) has a downwardly extending portion 3a and an upwardly extending portion 3b, both of which meet at a wing tip device root 7 (see also 207, 307, 407, 507 and 707). The downwardly extending portion 3a is not visible in FIG. 1b as it is obscured by the wing 1. The wing tip device 3 is joined to the tip of the wing 1 (see also 201, 301, 401, 501, 601, 701, 801, 901, 1001, 1101, 1201, 1301 and 1401) at a first connection 11, described in more detail below in connection with first connections 211, 311, 411, 511, 611, 711, 811, 911, 1011, 1111, 1211, 1311 and 1411.

In contrast to known arrangements, the wing tip device 3 in the first embodiment is braced by an external strut 9 (see also 209, 309, 409, 509, 609, 709, 809, 909, 1009, 1109 and 1309) extending from a second connection (e.g., joint) 13 (see also 213, 313, 413, 513, 613, 713, 813, 913, 1013, 1113, 1213, 1313 and 1413) on the wing 1 to third connection (e.g., joint) 15 (see also 215, 315, 415, 515, 615, 915, 1115, 1315 and 1415) approximately mid-way along the upwardly extending part 3b of the wing tip device 3. The strut 9 transfers the majority of aerodynamic loadings on the wing tip device (generated during use) to the wing 1. The loadings are transferred to the wing 1 at the second joint 13. Thus, by virtue of the strut 9, the loadings that would normally be reacted through the joint at the wing tip/wing tip device root, are instead transferred to a location further inboard on the wing 1.

Such an arrangement has a number of benefits from a structural perspective. In particular, the wing box at the inboard location on the wing 1 below the second joint 13 is relatively thick (compared to the thickness of the box at the wing tip). This means the wing box is better able to cope with the loading and requires minimal structural reinforcement. It also means that the loadings through the first joint 11 are relatively low, thereby reducing the need to reinforce or otherwise modify the wing tip. These benefits are especially attractive when a wing tip device is being retro-fitted, because there are considerable constraints and/or difficulties in modifying the structure of the wing.

As shown in FIG. 1a, the first, second and third joints 11, 13, 15 are all pin joints which are substantially unable to support bending moments across them. This means that the wing 1, strut 9 and wing tip device 3 are all connected by joints that ensure the assembly formed by those components is statically determinate. Such an arrangement is beneficial from a structures perspective because it enables the loads in the wing/wing tip device/strut to be more easily calculated, and therefore for the components to be tailored more precisely to their loadings.

Having the first joint 11 as a pin joint (only the axis of which is shown in FIG. 1b) is also beneficial in terms of the process of installing the wing tip device 3. During installation (not shown), the tip device 3 is attached to the wing 1 at the first joint 11, and can then be allowed to hang down below the joint 11 under its own weight. The strut 9 can then be fitted and when necessary the wing tip device can be pulled upwards and attached to the strut (at the third joint 15). This facilitates easy installation of the device.

FIGS. 2 to 7 show several other embodiments of the invention. Features in the other embodiment of the invention that correspond to similar features in the first embodiment of the invention, are shown with the same reference numerals as in the first embodiment, but with the addition of the prefix 'n' (or 'n0' where appropriate), where n indicates the number of the embodiment.

Figure 2:
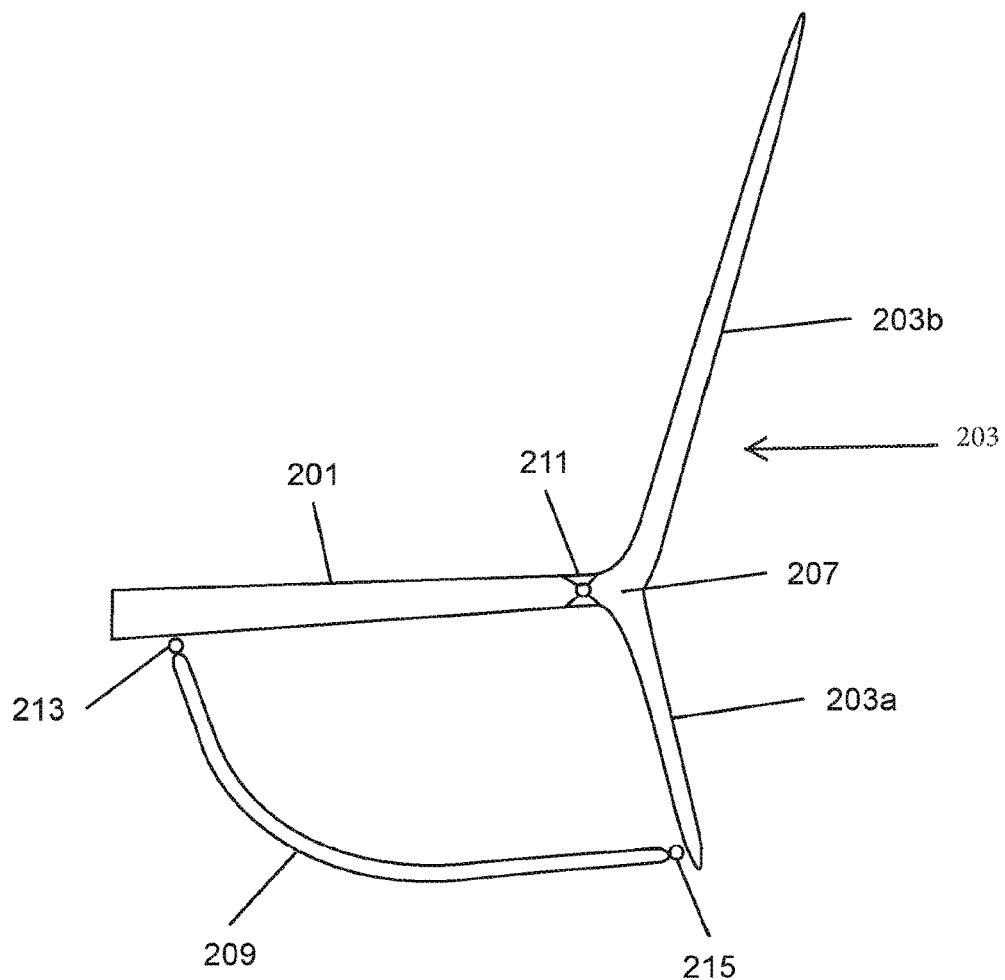
FIG. 2 shows a front view of part of a wing and a wing tip device on an aircraft according to a second embodiment of the invention.
Figure 3:
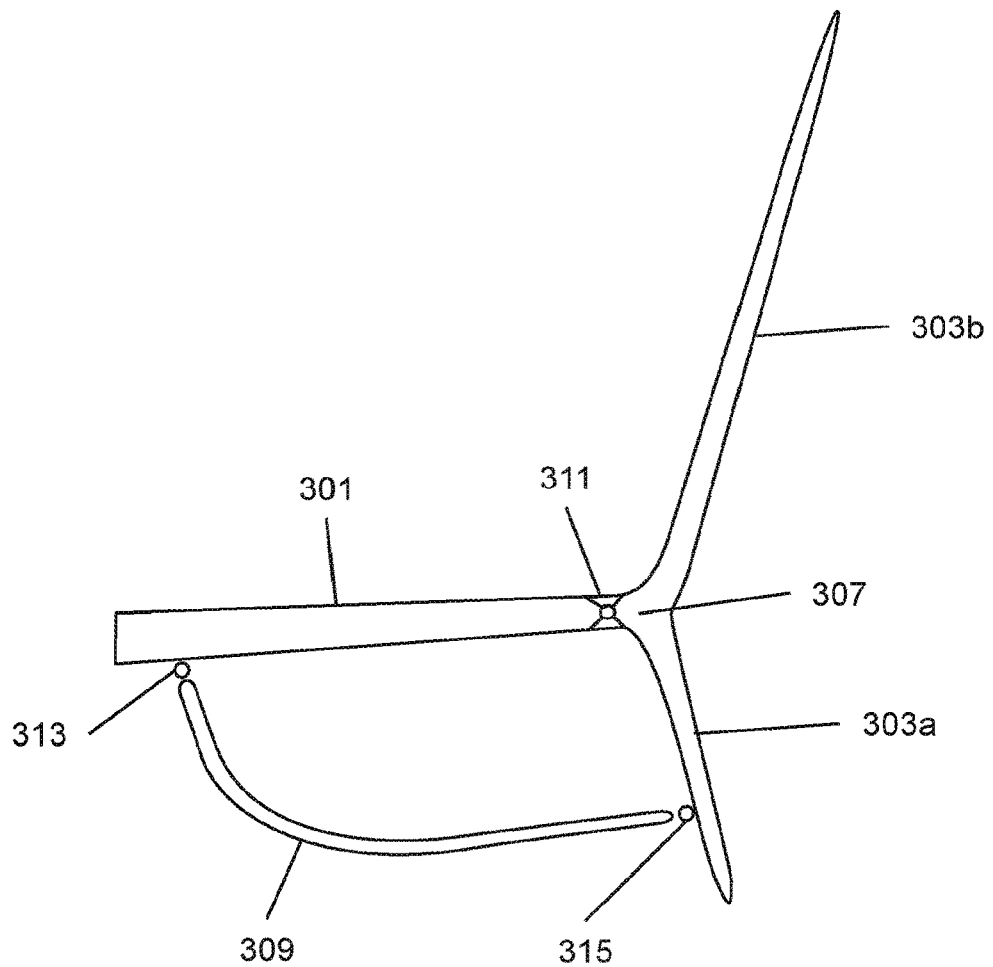
FIG. 3 shows a front view of part of a wing and a wing tip device on an aircraft according to a third embodiment of the invention.

The embodiment in FIG. 2 is identical to that shown in FIG. 1a except that the strut 209 is attached between the underside of the wing 201 and the end of the downwardly extending part 203a of the wing tip device 203. Thus the strut is typically in tension during use of the wing tip device (compared to being in compression in the first embodiment). Having the strut in tension is generally preferable from a structures perspective. The embodiment in FIG. 3 is identical to that shown in FIG. 2 except that the strut 309 is attached part-way along the downwardly extending part 303a of the wing tip device.

Figure 4:
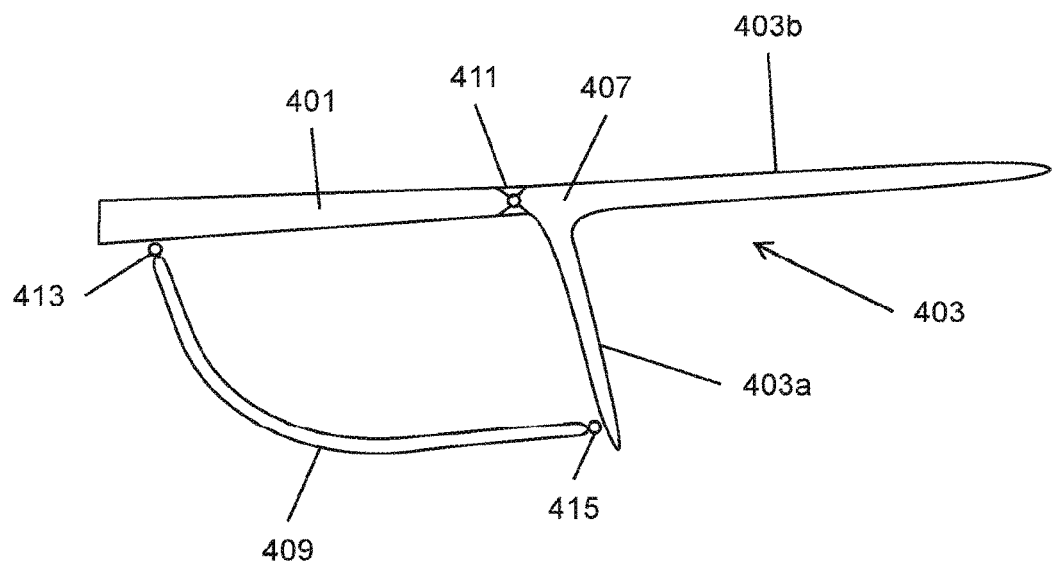
FIGS. 4 and 5 shows a front view of part of a wing and a wing tip device on an aircraft according to fourth and fifth embodiments of the invention respectively.
Figure 5:
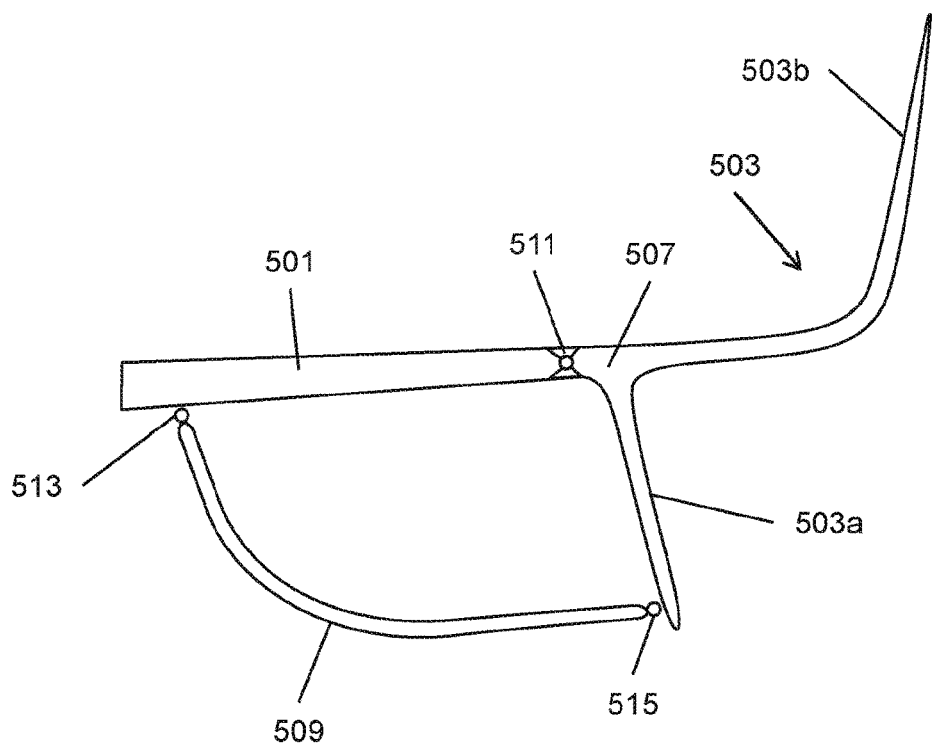

FIG. 4 shows and embodiment in which the wing tip device 403 comprises a planar wing extension 403b and a downwardly extending winglet 403a. FIG. 5 shows and embodiment in which the wing tip device 503 comprises an upwardly extending winglet 503b and an offset, downwardly extending winglet 503a.

Figure 6:
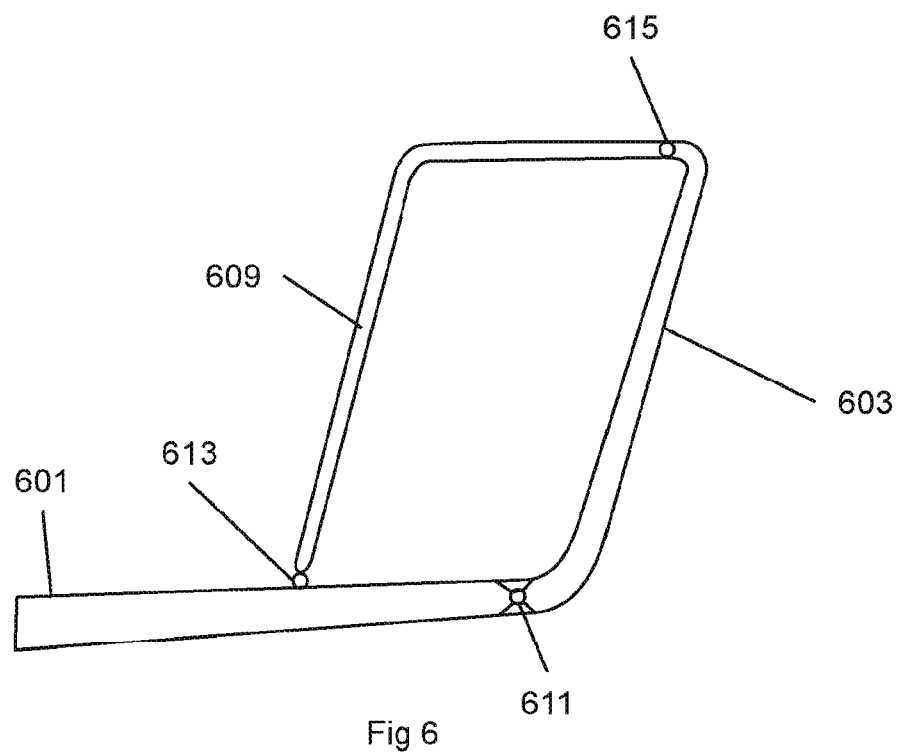
FIGS. 6 and 7 shows a front view of part of a wing and a wing tip device on an aircraft according to sixth and seventh embodiments of the invention respectively.

FIG. 6 shows an embodiment in which the wing tip device is an upwardly extending winglet 604, and the strut is L-shaped with the third connection 615 being at the tip of the winglet 603. The strut has an aerodynamic fairing (not shown) to minimise drag, but it does not deliberately form a lifting surface (i.e. it is not a continuation of the wing tip device). The strut 609 is located in the mid-chord region of the wing 601 and the wing tip device 603.

Figure 7:
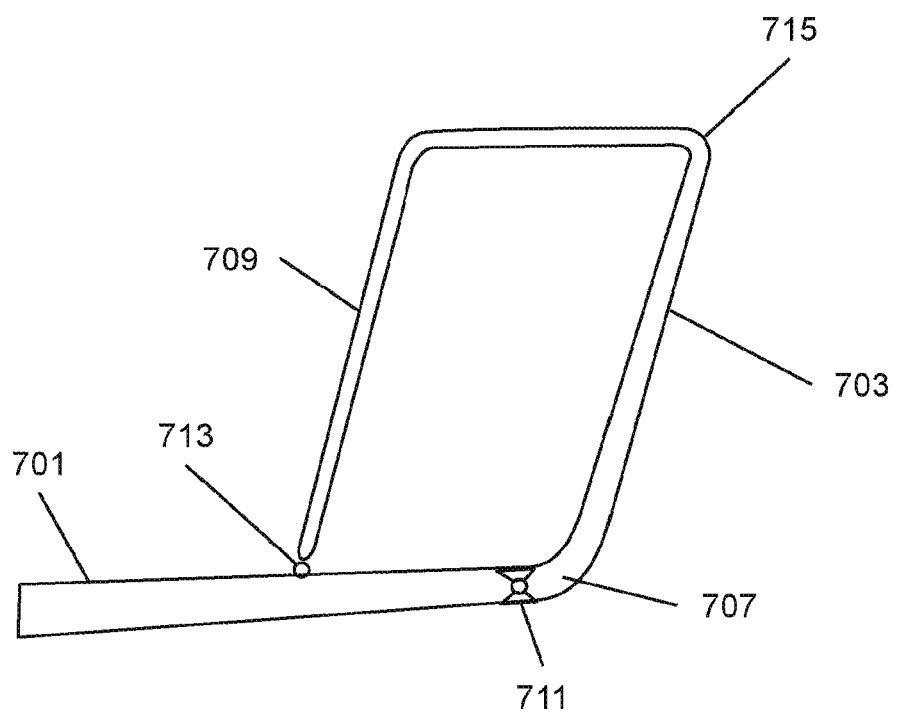

FIG. 7 shows a similar embodiment to FIG. 6 except that the third connection 715 is a rigid connection with the end of the winglet 703 rather than a pin joint.

Figure 8:
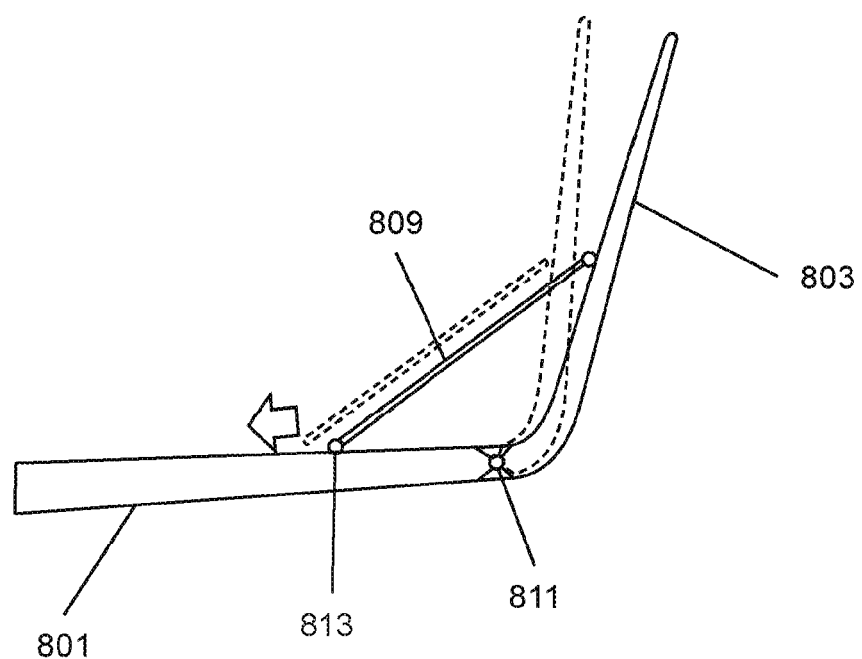
FIG. 8 shows a front view of part of a wing and a wing tip device on an aircraft according to an eighth embodiment of the invention.

FIG. 8 shows an arrangement that incorporates passive load alleviation. As shown by the dashed lines in FIG. 8, the winglet 803 is moveable from a high load configuration (solid lines) to a lower load configuration (phantom lines). The hinge line in the first joint 811 is angled to the direction of flight such that as the winglet 803 rotates to the low load configuration, the incidence changes, thereby reducing the load on the winglet 803. The second joint 813 is arranged to translate along the upper surface of the wing to enable such movement.

Figure 9A:
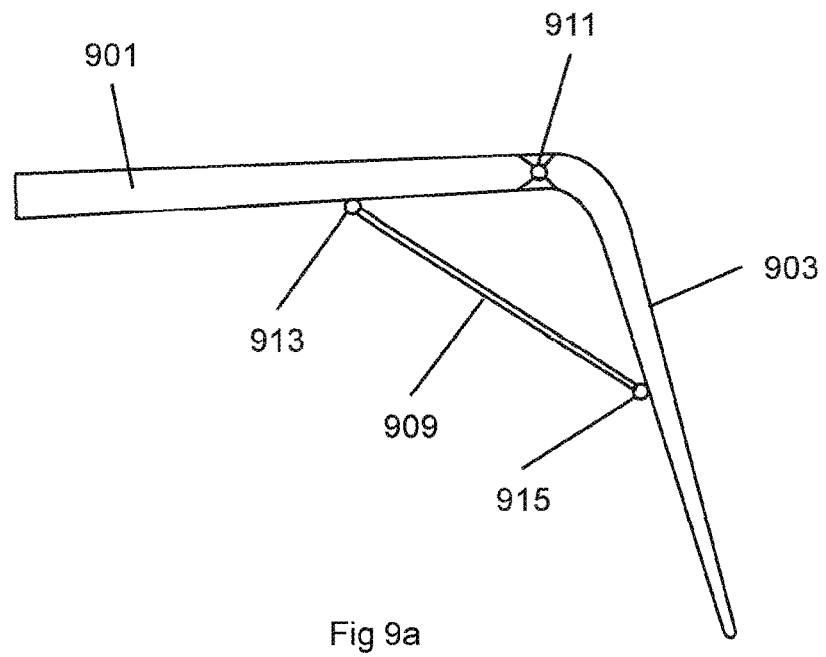
FIGS. 9a and 9b show a front view of part of a wing and a wing tip device on an aircraft according to a ninth embodiment of the invention, with FIG. 9b showing the wing tip device when moved to a ground configuration.
Figure 9B:
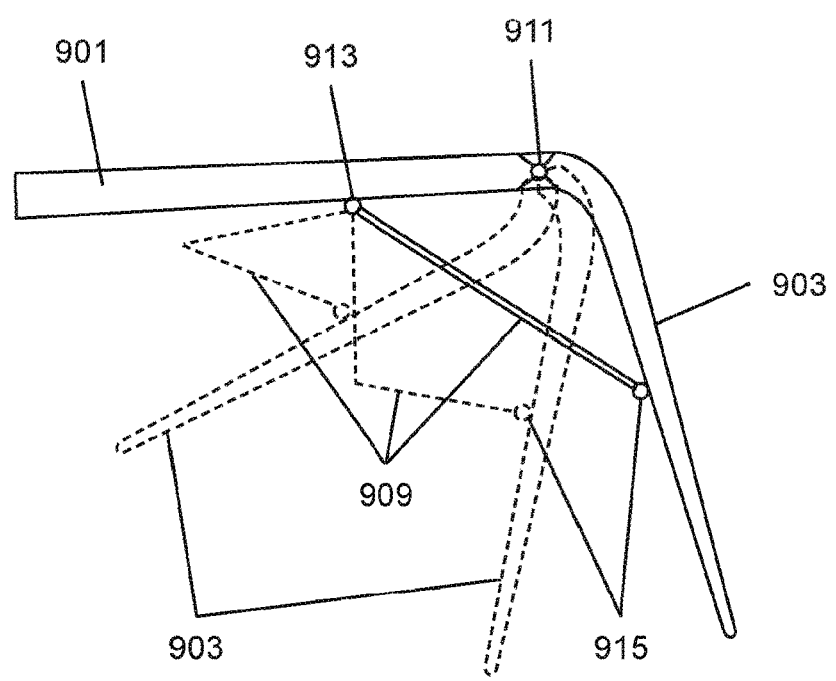
Figure 10:
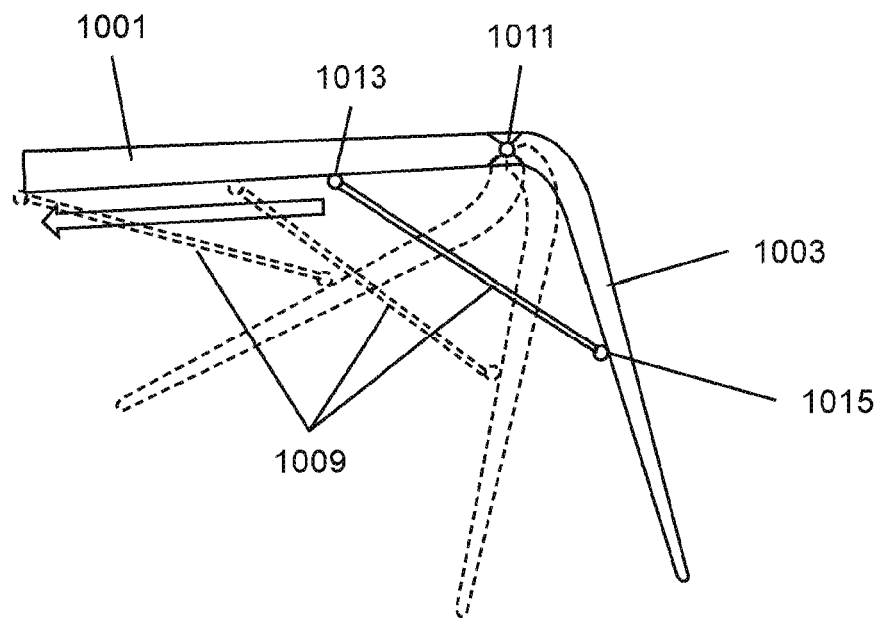
FIGS. 10 to 12 show front views of part of a wing and a wing tip device on an aircraft according to three further embodiments of the invention respectively, each Figure showing the wing tip device in a flight configuration and a ground configuration.
Figure 11:
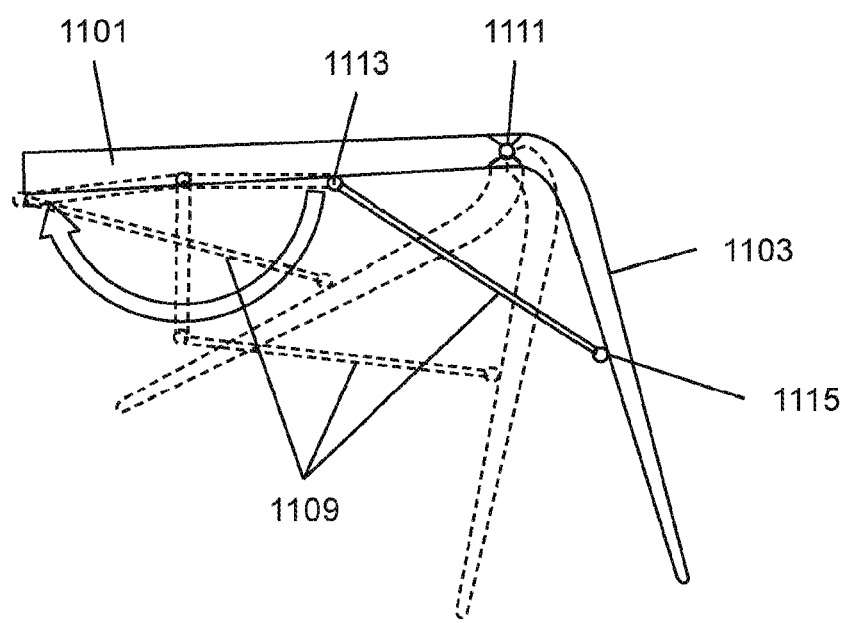

FIGS. 9a and 9b show an arrangement in which the winglet 903 is actuated from a flight configuration (FIG. 9a) to a ground configuration (phantom lines in FIG. 9b) in which the span is reduced. Such an arrangement may be beneficial where the maximum span is limited by airport gate restrictions. The strut 909 is arranged to articulate (see phantom lines in FIG. 9b) during the movement, which is effected by a rotary actuator (not shown). FIGS. 10 and 11 show further example embodiments that are similar to that in FIG. 9 but show different ways in which the strut 1009/1109 is arranged to move.

Figure 12:
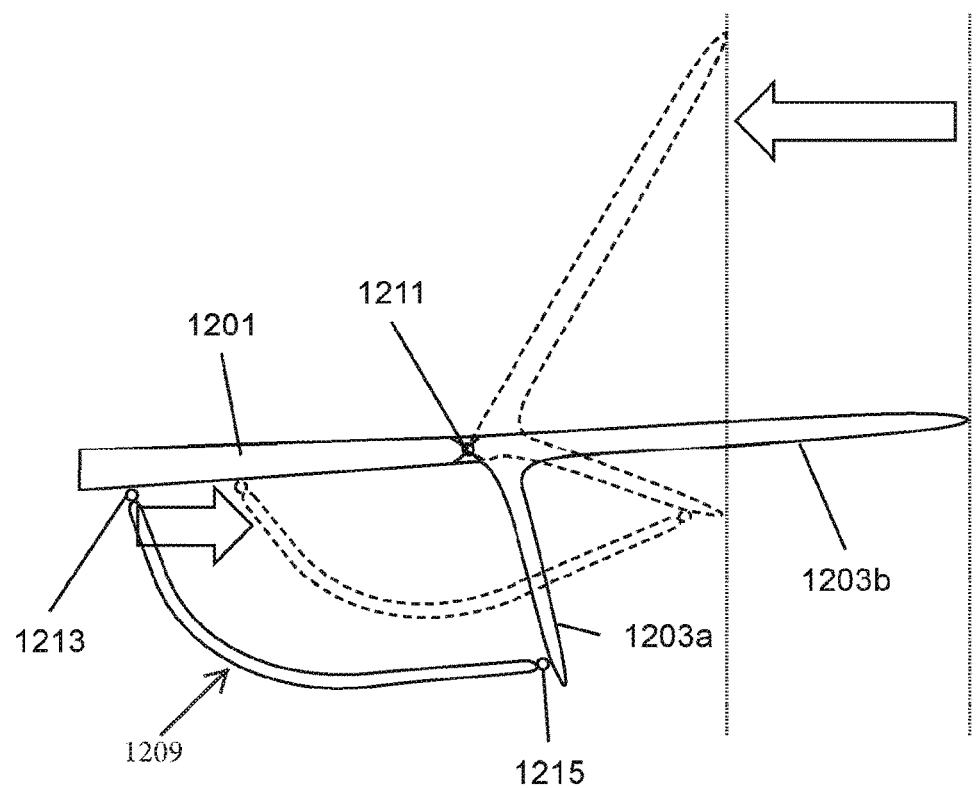

FIG. 12 shown the arrangement of the fourth embodiment of the invention (FIG. 4) but wherein the wing tip device is arranged to rotate to reduce the span. Such a span reduction is especially pronounced (for a given angular rotation) when using the planar wing extension 1203b.

Figure 13A:
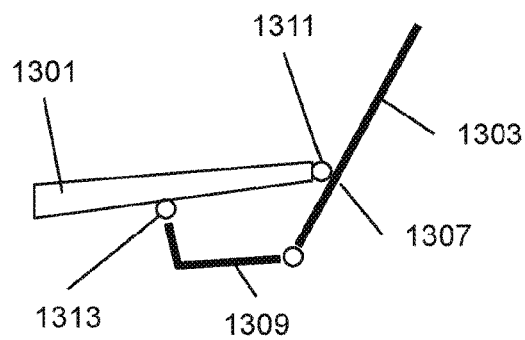
FIGS. 13a to 13c show schematic front views of part of a wing and a wing tip device on an aircraft according to three further embodiments of the invention respectively.
Figure 13B:
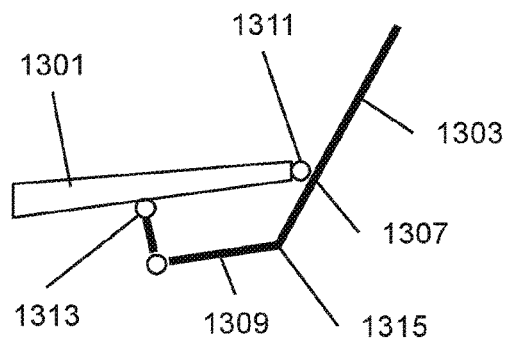
Figure 13C:
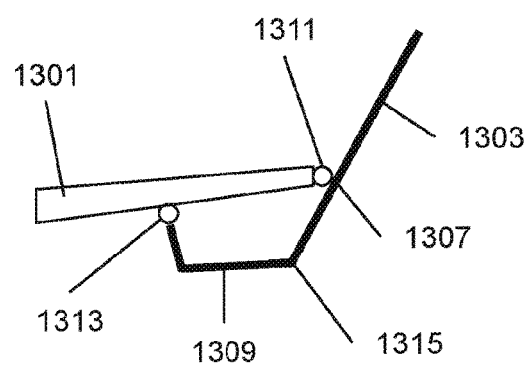

FIGS. 13a to 13c are schematics showing some further embodiments of the invention in which a wing tip device 1303 is braced by the strut 1309 to transfer loads into the wing 1301 at a location inboard of the wing tip root 1307 (see also 1407).

Figure 14A:
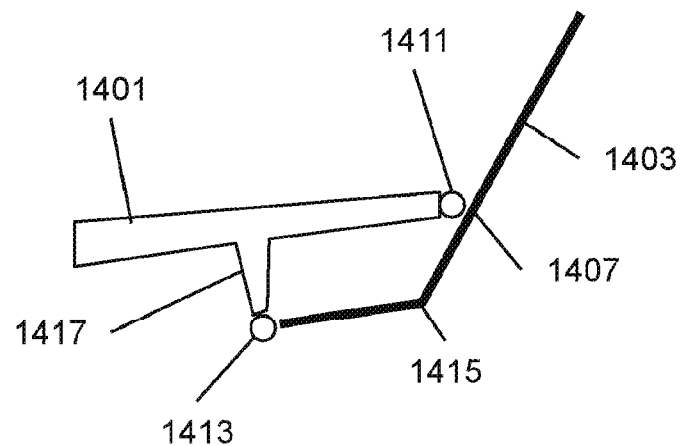
FIGS. 14a and 14b show schematic front views of part of a wing and a wing tip device on an aircraft according to two further embodiments of the invention respectively.
Figure 14B:
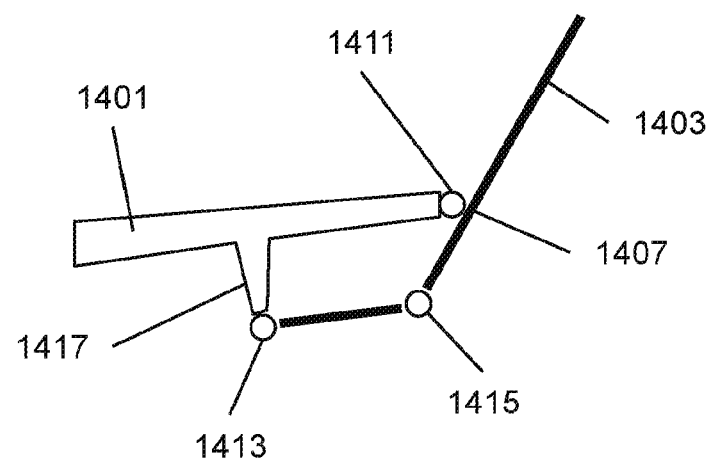

FIGS. 14a and 14b are schematics showing some further embodiments of the invention in which a wing tip device 1403 is braced by the strut 1409 to transfer loads into the wing 1401 at a location inboard of the wing tip root 1407. In both these embodiments, the wing comprises a stub 1417 connected to a wing rib (not shown). The stub 1417 facilitates a straightforward connection to the strut 1409. This is a particularly attractive embodiment when the wing tip device 1403 is being forward-fitted to an aircraft (i.e. the aircraft is being manufactured to an old design, but the wing tip device is being fitted during manufacture) because there are opportunities to easily integrate the stub into the wing structure.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A primary aircraft wing having a wing tip device joined thereto,
   wherein the root of the wing tip device is joined to a tip of the primary wing at a first connection,
   wherein a leading edge of the wing tip device is aligned along a spanwise direction with a leading edge of the primary wing across the first connection, and wherein an external strut extends between the primary wing and the wing tip device, the external strut being joined to the primary wing at a second connection, the second connection being inboard of the first connection and outboard of a root of the primary wing, such that loadings on the wing tip device generated during flight, are transferred, via the external strut, to a location on the primary wing that is inboard of where the root of the wing tip device is joined to the tip of the primary wing wherein the wing tip device is configured to pivot about the first connection, and the second connection and an end of the external strut at the second connection are configured to translate in the spanwise direction along the fixed primary wing as the wing tip device pivots about the first connection.

2. The aircraft wing according to claim 1, wherein the primary wing was originally designed not to have the wing tip device, the wing tip device having been retro-fitted or forward-fitted to the primary wing.

3. The primary aircraft wing according to claim 1, wherein an assembly comprising the primary wing, the external strut and the wing tip device is statically determinate.

4. The primary aircraft wing according to claim 1, wherein the wing tip device is moveable about the first connection between (i) a flight configuration for use during all flight operations during which the external strut is exposed to air flowing over the primary wing, and (ii) a ground configuration for use during ground-based operations, in which ground configuration the wing tip device is folded about the first connection such that the span of the aircraft is reduced.

5. The primary aircraft wing of claim 1, wherein the second connection is joined to a position on the primary wing closer to the wing tip device than to the root of the primary wing.

6. The primary aircraft wing of claim 1, wherein the primary wing is a mono-wing.

7. The primary aircraft wing of claim 1, wherein the trailing edge of the fixed primary wing is aligned in the spanwise direction with a trailing edge of the wing tip device across the first connection.

8. The primary aircraft wing of claim 1, wherein the second connection between the fixed primary wing and the external strut is closer to the trailing edge of the fixed primary wing than to the leading edge of the fixed primary wing.

9. The primary aircraft wing according to claim 1, wherein the first connection is unsuitable for transferring the loadings on the wing tip device to the primary wing, in the absence of the external strut.

10. The primary aircraft wing according to claim 9, wherein the first connection is substantially unable to support a bending moment across the first connection, wherein the bending moment is applied by the wing tip device in absence of the external strut.

11. The primary aircraft wing according to claim 1, wherein the external strut is joined to the wing tip device at a third connection.

12. The primary aircraft wing of claim 11, wherein the external strut is bowed between the second and third connections in a direction outward from the fixed primary wing and the wing tip device.

13. A method of modifying a primary wing by fitting a wing tip device, the method comprising the steps of:
joining a root of the wing tip device to a tip of the primary wing at a first connection,
aligning, along a spanwise direction, a leading edge of the wing tip device with a leading edge of the primary wing across the first connection, and
fitting an external strut extending between the primary wing and the wing tip device, the external strut being connected to the primary wing at a second connection, the second connection being inboard of the first connection and outboard of a root of the primary wing, such that loadings on the wing tip device generated during use, are transferred, via the external strut, to a location on the primary wing that is inboard of where the root of the wing tip device is joined to the tip of the primary wing,
wherein the external strut is exposed to air flowing across the primary wing during all flight operations of the primary wing.

14. The method according to claim 13, wherein the wing tip device is retro-fitted onto the primary wing that was not originally designed to receive the wing tip device, and the method further comprises the step of removing a pre-existing structure from the primary wing, prior to joining the root of the wing tip device to the tip of the primary wing at the first connection.

15. The method according to claim 13, wherein the wing tip device is forward-fitted onto the primary wing that was not originally designed to receive the wing tip device, and the method further comprises the step of manufacturing the tip of the primary wing to be suitable for joining to the root of the wing tip device at the first connection.

16. The method according to claim 13, wherein the wing tip device hangs below the first connection prior to the strut being fitted to extend between the primary wing and the wing tip device.

17. The method of claim 13, wherein the second connection is joined to a position on the primary wing closer to the wing tip device than to the root of the primary wing.

18. The method of claim 13, wherein the primary wing is a mono-wing.

19. The method of claim 13, further comprising aligning, along the spanwise direction, a trailing edge of the wing tip device with a trailing edge of the primary wing across the first connection.

20. The method of claim 13, wherein the wing tip device is configured to pivot about the first connection, and the second connection and an end of the external strut at the second connection are configured to translate in the spanwise direction along the fixed primary wing as the wing tip device pivots about the first connection.

21. The method of claim 13, wherein the second connection between the fixed primary wing and the wing tip device is closer to the trailing edge of the fixed primary wing than to the leading edge of the fixed primary wing.

22. The method of claim 13, wherein the external strut is bowed outward from the primary wing and the wing tip device.

23. A primary aircraft wing comprising:
a fixed primary wing having a leading edge, a trailing edge, a root and a wing tip opposite, along a spanwise direction, to the root;
a wing tip device having a leading edge, a trailing edge and a root;
a first connection connecting the wing tip of the fixed primary wing to the root of the wing tip device, wherein the leading edge of the fixed primary wing is aligned in the spanwise direction with the leading edge of the wing tip device across the first connection; and an external strut extending between the fixed primary wing and the wing tip device, wherein the external strut is joined to the fixed primary wing at a second connection outboard, along the spanwise direction, of the root of the fixed primary wing and inboard of the wing tip, and the external strut is exposed to air flowing across the primary wing during all flight operations of the primary wing.

24. The primary aircraft wing of claim 23, wherein the trailing edge of the fixed primary wing is aligned in the spanwise direction with the trailing edge of the wing tip device across the first connection.

25. The primary aircraft wing of claim 23, wherein the wing tip device is configured to pivot about the first connection, and the second connection and an end of the external strut at the second connection are configured to translate in the spanwise direction along the fixed primary wing as the wing tip device pivots about the first connection.

26. The primary aircraft wing of claim 23, wherein the second connection between the fixed primary wing and the wing tip device is closer to the trailing edge of the fixed primary wing than to the leading edge of the fixed primary wing.

27. The primary aircraft wing of claim 23, wherein the external strut is bowed between the second connection and wherein the external strut is joined to the wing tip device at a third connection that extends in a direction outward from the fixed primary wing and the wing tip device.

* * * * *